US009955714B2

(12) United States Patent
Graham et al.

(10) Patent No.: US 9,955,714 B2
(45) Date of Patent: May 1, 2018

(54) MARINADES FOR MEAT AND SEAFOOD CONTAINING NATURAL METABOLITES

(75) Inventors: Aaron R. Graham, Chicago, IL (US); Michael T. Bunczek, Lisle, IL (US); Donald B. Bernacchi, Alsip, IL (US); Louis E. Windecker, Jr., Tinley Park, IL (US)

(73) Assignee: GRIFFITH FOODS INTERNATIONAL INC., Alsip, IL (US)

( * ) Notice: Subject to any disclaimer, the term of this patent is extended or adjusted under 35 U.S.C. 154(b) by 728 days.

(21) Appl. No.: 13/033,402

(22) Filed: Feb. 23, 2011

(65) Prior Publication Data
US 2011/0206807 A1 Aug. 25, 2011

Related U.S. Application Data

(60) Provisional application No. 61/307,243, filed on Feb. 23, 2010.

(51) Int. Cl.
| A23L 1/31 | (2006.01) |
| A23L 1/22 | (2006.01) |
| A23L 13/70 | (2016.01) |
| A23L 27/24 | (2016.01) |
| A23L 13/00 | (2016.01) |
| A23L 13/40 | (2016.01) |
| A23L 13/50 | (2016.01) |

(52) U.S. Cl.
CPC .............. *A23L 13/72* (2016.08); *A23L 13/06* (2016.08); *A23L 13/428* (2016.08); *A23L 13/52* (2016.08); *A23L 27/24* (2016.08); *A23Y 2320/00* (2013.01)

(58) Field of Classification Search
CPC ...... A23L 1/23; A23L 1/3106; A23L 1/31445; A23L 1/3152; A23L 1/3182; A23L 13/72; A23L 13/06; A23L 13/52; A23L 13/428; A23L 27/24; A23Y 2320/00
USPC ........ 426/43, 650, 652, 48, 55, 56, 534, 656
See application file for complete search history.

(56) References Cited

U.S. PATENT DOCUMENTS

| 2,465,905 | A | * | 3/1949 | Meade et al. .................... 426/41 |
| 3,394,017 | A | | 7/1968 | Giacino |
| 5,096,718 | A | | 3/1992 | Ayres et al. |
| 5,137,736 | A | * | 8/1992 | Eaton et al. ....................... 426/7 |
| 5,173,319 | A | * | 12/1992 | Boudreaux et al. .......... 426/326 |
| 5,356,647 | A | | 10/1994 | Mason et al. |
| 6,379,739 | B1 | | 4/2002 | Formanek et al. |
| 6,991,820 | B2 | | 1/2006 | Ming et al. |
| 7,582,444 | B2 | * | 9/2009 | Hughes ............................ 435/41 |
| 2007/0059423 | A1 | | 3/2007 | Toledo |
| 2009/0004353 | A1 | | 1/2009 | Topps |
| 2009/0098254 | A1 | | 4/2009 | Baublits et al. |
| 2009/0214752 | A1 | | 8/2009 | Nielsen |
| 2010/0310738 | A1 | | 12/2010 | Ludwig |

FOREIGN PATENT DOCUMENTS

| JP | 09000209 A | 1/1997 |
| JP | 02000000079 A | 1/2000 |
| WO | 02/24003 A2 | 3/2002 |

OTHER PUBLICATIONS

Buttermilk Herb Marinade (Oct. 23, 2006) xp-002632966.*
Manufacturing yogurt and fermented milks, Ed. Chandan, R.C., et al., Blackwell Publ. 2006.*
Dairy products (Jan. 9, 2009) downloaded from the internet at http://www.answers.com/topic/dairy-product-2.*
Giraffa, G., Studying the dynamic of microbial populations during food fermentations, FEMS Microbio. Rev. 28 (2004) 251-260.*
Marshall, V.M., Starter cultures for milk fermentation and their characteristics, J. of the Soc. Diary Technol. 46 (1993) 49-56.*
Xu, SA, et al., Conjugated linoleic acid content an organoleptic attributes of fermented milk products produced with probiotic bacteria. J.Agri. Food Chem. 52 (2005) 9064-9072.*
Sodini ,I. et al. Compositional and Functional properties of buttermilk: a comparison between sweet, sour and whey buttermilk. Dairy Sci. 89 (2006) 525-536.*
Alvarado et al., "Marination to Improve Functional Properties and Safety of Poultry Meat", The Journal of Applied Poultry Research, 2007, 16:113-120.
Berrang et al., "Controlling Listeria Monocytogenes in Further Processed Meat", USDA Research, Education & Economics Information System, Sep. 30, 2007, 2 pages.
Bremer et al., "Efficacy of Marinades against Listeria monocytogenes Cells in Suspension or Associated with Green Shell Mussels (*Perna canaliculus*)", Applied and Environmental Microbiology, Apr. 1995, 61(4):1514-1519.
United States Department of Agriculture Food Safety and Inspection Service, "Safe and Suitable Ingredients Used in the Production of Meat and Poultry Products", FSIS Directive 7120.1, Amendment 20, Attachments 1 and 2, Oct. 5, 2009, pp. 4-37.
International Search Report and Written Opinion of the ISA/EP issued in related application No. PCT/US2011/025911, dated May 4, 2011, 15 pages.
Anonymous, "Buttermilk Herb Marinade", <http://www.food.com/recipeprint.do?rid=191804>, Oct. 23, 2006, 2 pages.
"Gourmet Gardens Fresh Blends Thai Herb & Spice Blend", Mintel Global New Products Database, Jan. 2010, 2 pages.
"Gourmet Herb & Spice Company Spicy Kebab Marinade", Mintel Global New Products Database, Oct. 2009, 3 pages.
"Nando's Lime & Coriander Peri-Peri Marinade", Mintel Global New Products Database, Jun. 2009, 2 pages.
"RU2084184C1 Method of Meat Product Making", WPI World Patent Information Derwent Accession No. 1998-108766 [10], Jul. 20, 1997, vol. 1998, No. 10, 1 page.

(Continued)

*Primary Examiner* — Leslie A Wong
(74) *Attorney, Agent, or Firm* — Michael Best & Friedrich LLP

(57) ABSTRACT

This invention is directed to a composition and application of marinades that contain, as key active ingredients, a combination of organic salts derived by fermentation of sugars. The resulting all natural marinades substantially improve cook yield, juiciness, flavor, and color in meat and in seafood, in a surprisingly effective way.

12 Claims, 2 Drawing Sheets

(56) References Cited

OTHER PUBLICATIONS

Lyon et al., "Descriptive Sensory Analysis of Broiler Breast Fillets Marinated in Phosphate, Salt, and Acid Solutions", Poult Sci., Feb. 2005, 84(2):345-349.
Brazilian Office Action for Application No. BR112012021710-0 dated Nov. 7, 2017 (10 pages, English translation included).

* cited by examiner

Cook Yield Results for Baked Chicken Breast Samples

Graph II  Cook Yield Results for Steamed Chicken Breast Samples

MARINADES FOR MEAT AND SEAFOOD CONTAINING NATURAL METABOLITES

CROSS-REFERENCE TO RELATED PATENT APPLICATIONS

This patent application claims the benefit of U.S. Provisional Patent Application No. 61/307,243, filed Feb. 23, 2010.

FIELD OF THE INVENTION

This invention pertains to marinades and, more particularly, to marinades that contain natural metabolite salts and, optionally, peptides, polypeptides, and phospholipids, all derived through fermentation of cultured sugars to improve cook yield, juiciness, flavor, and color in meat and seafood.

BACKGROUND OF THE INVENTION

Animal protein-containing food products, primarily meat and seafood, are commonly treated with marinades. Conventional marinades include, inter alia, salt, spices, acids, starches and gums which help extend the shelf life of marinated meat and seafood. In addition to extending shelf life, marinating meats and seafood may improve their flavor and tenderness after the marinated meat and seafood is cooked, producing an enhanced eating experience.

Additives such as phosphates have been used in the past in marinades to increase the moisture retention of marinated meats and seafood to further enhance the tenderness, juiciness and yield of the products. Unfortunately, however, the use of phosphates is unpopular because their use increases the phosphorus content of food processing plant effluents and, most importantly, because they are chemically synthesized rather than formed in nature and therefore are not "natural".

Since consumers widely believe that natural food ingredients are healthier than chemically synthesized ingredients, the use of phosphates in foods is avoided where possible. Therefore, there is a substantial need for marinades that improve cook yield, juiciness, flavor and color in meat and seafood using only natural ingredients. The present invention makes such a marinade possible by providing the functionality of phosphates in the form of a yield additive that contains natural metabolite salts and, optionally, peptides, polypeptides, and phospholipids, all derived through fermentation of sugars.

SUMMARY OF THE INVENTION

This invention is directed to the composition and application of marinades that contain, as key active ingredients, a combination of organic salts and, optionally, peptides polypeptides, and phospholipids, all derived by fermentation of sugars. These new key active ingredients may be used with known ingredients commonly found in marinades including, eg., salt, spices, flavorings, acids, starches and gums. The resulting all natural marinades substantially improve cook yield, juiciness, flavor, and color in meat (e.g., beef, pork and poultry) and in seafood, in a surprisingly effective way.

BRIEF DESCRIPTION OF THE DRAWINGS

In order to aid in understanding the invention, it will now be described in connection with exemplary embodiments thereof and with reference to the accompanying drawings wherein.

DETAILED DESCRIPTION

Figure 1:
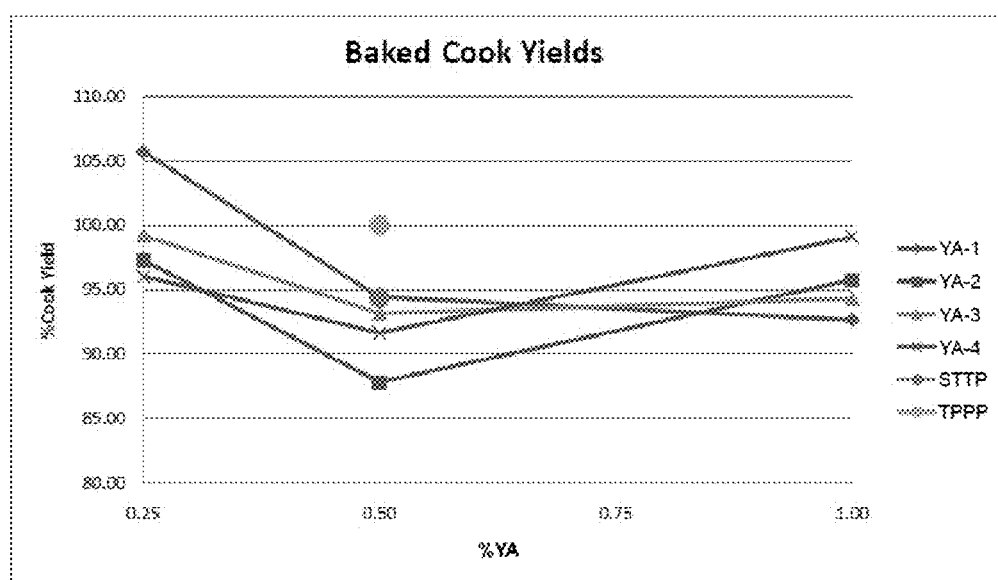
FIGS. 1 and 2 are graphs of cook yield referenced in Example 1.

The key active ingredients of the present invention are a combination of natural metabolites (organic acids) produced by fermenting milk sugars, whey sugars, dextrose or another suitable sugars with one or more food grade bacterial cultures.

For example, *proprionicbacterium* species can be applied to milk, whey, dextrose or other suitable sugars to produce as metabolites primarily acetic acid, succinic acid, and propionic acid. The fermentation culture may also include yeast extracts, protein hydrolysates or other protein-containing stimulants. Also, buffers, acids, salts, and other processing aids may be included to facilitate metabolite production. After the *proprionicbacterium* is developed up to an appropriate level of cells per ml, the growth culture can be heated to kill the innoculated bacteria prior to use of the metabolites (or their derivatives) and other components in marinades.

The fermentation process will be tailored so that most of the naturally occurring metabolites produced are organic acids. These organic acids preferably are subsequently converted to organic salts. The resulting composition (including optionally peptides, polypeptides and phospholipids present in the growth culture) is a natural marinade additive that improves cook yield and juiciness, as well as flavor, and color in meat and seafood. Therefore, it is generally referred to below as a "yield additive".

In addition, one or more phospholipids that are a natural component of the bacterial cell membranes also may be present in the yield additive. These phospholipids are believed to have a positive effect on yield due to the hydrophilic polar portion of the phospholipid structure, and possibly also due to the emulsifying or fat binding properties of the lipophilic section of the phospholipid structure. We do not, however, intend to be bound by this theory of operation.

Lactic acid bacteria may be used to also generate and thereby contribute polysaccharides (xanthan gum or similar polysaccharides) to the yield additive through fermentation of the starting sugars. When present, these polysaccharides are believed to also contribute to the functionality of the yield additive.

In summary, the use of the fermentation-derived yield additives in marinades unexpectedly produces outstanding cook yield, juiciness, flavor, and color in marinated meat and seafood.

Table I below lists the compositions of four yield additive samples YA-1 to YA-4, that may be used in the practice of this invention as demonstrated in the Examples. These yield additive samples are produced by fermenting dextrose by applying *proprionicbacterium* species and one or more other bacterial species and converting the organic acids produced to their salt form.

TABLE I

Yield Additive (YA) Samples

|  | YA-1 | YA-2 | YA-3 | YA-4 |
|---|---|---|---|---|
| pH (10% solution) | 7.84 | 8.61 | 9.62 | 9.42 |
| Sodium Acetate | 19.7 | 19.7 | 19.3 | 19.0 |
| Sodium Citrate | 1.5 | 1.2 | 1.6 | 1.7 |
| Sodium Tartrate | 1.7 | 1.6 | 1.3 | 1.4 |

TABLE I-continued

| Yield Additive (YA) Samples | | | | |
|---|---|---|---|---|
| | YA-1 | YA-2 | YA-3 | YA-4 |
| Sodium Succinate | 12.0 | 8.9 | 12.6 | 12.6 |
| Sodium Propionate | 36.3 | 35.2 | 36.0 | 38.0 |
| Total Salts | 71.2 | 66.6 | 70.8 | 72.7 |

Compositions of this type are currently used for controlling microbiological growth in bakery goods. They have not previously been used in connection with meat or seafood for the purpose of improving cook yield, juiciness, flavor or color. Indeed, the low pH characteristics of the material (particularly the pH 7.84 of YA-1 of Table 1) would suggest to one of ordinary skill in the art that these materials are not viable candidates for marinades to improve cook yield since such materials typically have a pH of at least about pH 9-10. Yet, as shown in the Examples, the YA-1 composition, which has the lowest pH of the four yield additives examined, produces the best improvement in cook yield. (See Table III.)

Currently preferred yield additives include primarily combinations of the following organic salts: acetate, propionate, lactate, and succinate. The actual levels of the acetate, propionate and succinate may be tailored by adjusting the parameters of the fermentation process including, culture(s), food source (type and quantity of sugar available to metabolize), temperature and oxygen content during generally anaerobic stages of the fermentation process to produce the corresponding organic acids which are then converted to the salt form. Low levels (about 1-2 percent by weight) of citrate and tartrate salts (derived from citric acid and tartaric acid) may also be present as a fixed byproduct of the fermentation process. Also, in some applications the fermentation parameters may be adjusted to provide and produce fumaric and/or other organic acids in the yield additives.

Conversion of the organic acids to the salt form is accomplished by reacting the fermentation-produced acids with appropriate bases (e.g., NaOH, CaOH, KOH, or Mg(OH)$_2$,). The currently preferred salts are sodium and potassium salts produced by reaction with NaOH or KOH although salts produced by reaction with Mg(OH)$_2$ and CaOH may be used. When present, fumaric or other organic acids may similarly be converted to their salt forms.

Examples of useful organic salt combinations include:

| | 1 | 2 | 3 | 4 | 5 | 6 | 7 |
|---|---|---|---|---|---|---|---|
| Lactate |  |  |  | ✓ | ✓ | ✓ | ✓ |
| Succinate | ✓ | ✓ | ✓ | ✓ | ✓ |  | ✓ |
| Acetate | ✓ | ✓ | ✓ | ✓ |  |  | ✓ |
| Propionate | ✓ | ✓ |  | ✓ | ✓ | ✓ | ✓ |
| Citrate | ✓ |  |  |  |  |  | ✓ |
| Tartrate | ✓ |  | ✓ |  |  |  |  |

Also, concentrations of these salts will produce synergistic results in terms of cook yield, juiciness, flavor and color. Among preferred ratios are the following:

| | 1 % | 2 % | 3 % | 4 % | 5 % | 6 % | 7 % | 8 % |
|---|---|---|---|---|---|---|---|---|
| Lactate | 50 | 30 | 40 | 76 | 30 | 40 | 20 | 30 |
| Succinate | 20 | 28 | 12 | 5 | 6 | 16 | 15 | 6 |
| Acetate | 16 | 28 | 34 | 5 | 50 | 20 | 21 | 30 |
| Propionate | 10 | 10 | 10 | 10 | 10 | 20 | 40 | 30 |
| Citrate | 2 | 2 | 2 | 2 | 2 | 2 | 2 | 2 |
| Tartrate | 2 | 2 | 2 | 2 | 2 | 2 | 2 | 2 |
| | 100 | 100 | 100 | 100 | 100 | 100 | 100 | 100 |

| | 9 % | 10 % | 11 % | 12 % | 13 % | 14 % | 15 % | 16 % |
|---|---|---|---|---|---|---|---|---|
| Lactate | 5 | 10 | 15 | 10 | 24 | 20 | 10 | 15 |
| Succinate | 11 | 20 | 15 | 40 | 24 | 20 | 28 | 20 |
| Acetate | 30 | 26 | 30 | 20 | 24 | 20 | 15 | 15 |
| Propionate | 50 | 40 | 36 | 26 | 24 | 20 | 15 | 10 |
| Citrate | 2 | 2 | 2 | 2 | 2 | 10 | 30 | 20 |
| Tartrate | 2 | 2 | 2 | 2 | 2 | 10 | 2 | 20 |
| | 100 | 100 | 100 | 100 | 100 | 100 | 100 | 100 |

The marinades of the invention may contain, in addition to the yield additive, functional ingredients as follows on an as delivered basis:

| Other Functional Ingredients | Broad Percentages by Weight* | Preferred Percentages by Weight* |
|---|---|---|
| NaCl | 0.1-3.0 | 0.5-1.5 |
| Spices | 0.01-3.0 | 0.1-1.0 |
| Starches | 0.0-2.0 | 0.5-1.0 |
| Gums | 0.0-1.0 | 0.001-0.4 |

*Balance typically will be water.

Marinades containing the yield additives of this invention (as well as other functional ingredients commonly found in marinades as noted above) will be applied by tumbling (preferably in a vacuum), by injection, by massage, by soaking, or by combinations of these application techniques. The marinades will be applied at levels sufficient to achieve pick-up in the marinated meat or seafood of about 0.01 to 2.0 percent by weight yield additive based on the weight of the meat or seafood substrate and preferably will be delivered to achieve pick-up at a level sufficient to achieve pick-up in the marinated meat or seafood of about 0.10 to 0.50% by weight yield additive. The balance will be the other functional additives and water.

The following example further illustrates the invention but should not be construed as in any way limiting its scope.

EXAMPLES

Example 1

An aqueous marinade stock solution was formulated to deliver on a weight basis about 0.5% salt and about 0.013% of gums. A series of marinades were made using the stock solution by adding sufficient levels of YA-1, YA-2, YA-3, and YA-4 to deliver these yield additives at levels of 1.0% (high), 0.5% (medium), and 0.25% (low), respectively. In all cases, the yield additives included fermentation-derived peptides and polypeptides as well as phospholipids present in the spent bacterial cell membranes. These marinade compositions are listed in Table II below.

TABLE II

Composition of marinades.

| Description | NaCl | STPP | TPPP | YA-1 | YA-2 | YA-3 | YA-4 | Gum | Water |
|---|---|---|---|---|---|---|---|---|---|
| A STPP-Control | 2.500 | 2.500 | | | | | | .063 | 94.937 |
| B YA-1 Med | 2.500 | | | 2.500 | | | | .063 | 94.937 |
| C YA-2 Med | 2.500 | | | | 2.500 | | | .063 | 94.937 |
| D YA-3 Med | 2.500 | | | | | 2.500 | | .063 | 94.937 |
| E YA-4 Med | 2.500 | | | | | | 2.500 | .063 | 94.937 |
| F YA-1 Low | 2.500 | | | 1.250 | | | | .063 | 94.937 |
| G YA-2 Low | 2.500 | | | | 1.250 | | | .063 | 94.937 |
| H YA-3 Low | 2.500 | | | | | 1.250 | | .063 | 94.937 |
| I YA-4 Low | 2.500 | | | | | | 1.250 | .063 | 94.937 |
| J YA-1 High | 2.500 | | | 5.000 | | | | .063 | 94.937 |
| K YA-2 High | 2.500 | | | | 5.000 | | | .063 | 94.937 |
| L YA-3 High | 2.500 | | | | | 5.000 | | .063 | 94.937 |
| M YA-4 High | 2.500 | | | | | | 5.000 | .063 | 94.937 |
| N TPPP Control | 2.500 | | 2.500 | | | | | .063 | 94.937 |

As can be seen in Table II, two control marinades were made using the stock solution to provide 0.5% (delivered) sodium tripolyphosphate (STPP) and tetrapotassium pyrophosphate (TPPP) respectively when incorporated into the substrate at a level of 20% by weight.

Next, three sets of test samples comprising four ounce boneless, skinless chicken breasts were prepared by injecting with each of the marinades at a level of 20% weight based on the weight of the chicken breasts. The breasts were then individually vacuum-sealed and refrigerated.

After two days, one set of test samples was removed from the vacuum pouches and baked in an oven at 400° F. to an internal temperature of 170° F. and screened by a sensory panel. The sensory panel was a group of four individuals trained to evaluate, compare, and quantify organoleptic characteristics of food. Each member of the panel previously completed a minimum of 120 hours of descriptive analysis training. The panelists met prior to the initial evaluations of the test products to develop the terminology and ballot used in the study. Sensory data was continuously monitored and collected.

The next day, the remaining two sets of samples were steamed in the vacuum pouches at 212° F. to an internal temperature of 170° F. and again screened by the same sensory panel.

Cook Yield

Cook yield data for the baked samples is attached and plotted in Graph I of FIG. 1 and listed in Table III below.

TABLE III

| BAKED | green wt. (g) | post-inject (g) | post cook wt (g) | % pump | % cook yield |
|---|---|---|---|---|---|
| STPP-Control | 117 | 138 | 120 | 17.9 | 102.56 |
| YA-1 Med | 91 | 110 | 88 | 20.9 | 96.70 |
| YA-2 Med | 115 | 137 | 107 | 19.1 | 93.04 |
| YA-3 Med | 89 | 109 | 88 | 22.5 | 98.88 |
| YA-4 Med | 101 | 120 | 93 | 18.8 | 92.08 |
| YA-1 Low | 102 | 129 | 101 | 26.5 | 99.02 |
| YA-2 Low | 107 | 128 | 102 | 19.6 | 95.33 |
| YA-3 Low | 102 | 122 | 95 | 19.6 | 93.14 |
| YA-4 Low | 91 | 109 | 85 | 19.8 | 93.41 |
| YA-1 High | 113 | 136 | 119 | 20.4 | 105.31 |
| YA-2 High | 107 | 129 | 112 | 20.6 | 104.67 |
| YA-3 High | 103 | 123 | 109 | 19.4 | 105.83 |
| YA-4 High | 96 | 116 | 101 | 20.8 | 105.21 |
| TPPP Control | — | — | — | — | — |

The 0.25% "low" marinade was inadvertently injected at too high a pump level (26.5%), likely inflating its cook yield. The remaining marinades containing the yield additives improved "baked" cook yield at a level comparable to that obtained using 0.5% phosphates at 0.25% or 1.0%. The dip in cook yield of the 0.5% "medium" marinades is unexpected and believed to be an error. If disregarded, the cook yield was independent of the yield additive concentration between 0.25 and 1.0% when the chicken breast was baked.

Figure 2:
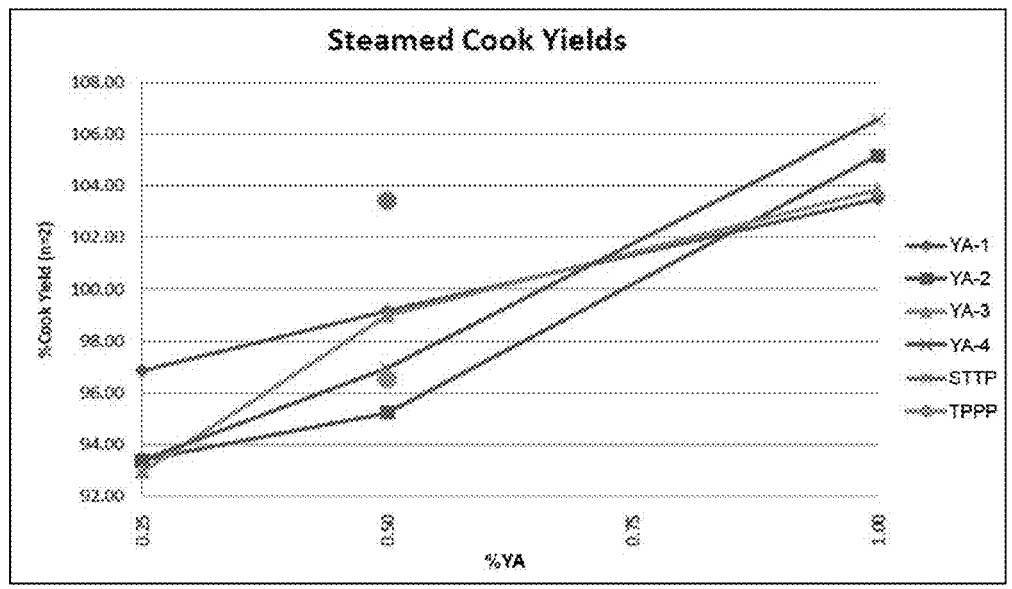

Cook yield data for the steamed samples is plotted in the attached Graph II of FIG. 2 and listed in Tables IV and V below.

TABLE IV

Sample weights and calculated values for steamed chicken breast #1.

| STEAMED #1 | green wt. (g) | post-inject (g) | post cook wt (g) | % pump | % cook yield |
|---|---|---|---|---|---|
| STPP-Control | 116 | 142 | 121 | 22.4 | 104.31 |
| YA-1 Med | 123 | 147 | 125 | 19.5 | 101.63 |
| YA-2 Med | 116 | 140 | 113 | 20.7 | 97.41 |
| YA-3 Med | 111 | 132 | 110 | 18.9 | 99.10 |
| YA-4 Med | 109 | 133 | 111 | 22.0 | 101.83 |
| YA-1 Low | 113 | 135 | 107 | 19.5 | 94.69 |
| YA-2 Low | 94 | 114 | 86 | 21.3 | 91.49 |
| YA-3 Low | 111 | 132 | 103 | 18.9 | 92.79 |
| YA-4 Low | 121 | 145 | 113 | 19.8 | 93.39 |
| YA-1 High | 120 | 143 | 122 | 19.2 | 101.67 |
| YA-2 High | 106 | 127 | 112 | 19.8 | 105.66 |
| YA-3 High | 108 | 128 | 110 | 18.5 | 101.85 |
| YA-4 High | 114 | 140 | 123 | 22.8 | 107.89 |
| TPPP Control | 116 | 139 | 112 | 19.8 | 96.55 |

TABLE V

Sample weights and calculated values for steamed chicken breast #2.

| STEAMED #2 | green wt. (g) | post-inject (g) | post cook wt (g) | % pump | % cook yield |
|---|---|---|---|---|---|
| STPP-Control | 124 | 150 | 117 | 21.0 | 94.35 |
| YA-1 Med | 108 | 130 | 102 | 20.4 | 94.44 |
| YA-2 Med | 107 | 128 | 94 | 19.6 | 87.85 |
| YA-3 Med | 132 | 158 | 123 | 19.7 | 93.18 |
| YA-4 Med | 120 | 146 | 110 | 21.7 | 91.67 |
| YA-1 Low | 88 | 115 | 93 | 30.7 | 105.68 |
| YA-2 Low | 111 | 133 | 108 | 19.8 | 97.30 |
| YA-3 Low | 126 | 152 | 125 | 20.6 | 99.21 |
| YA-4 Low | 101 | 125 | 97 | 23.8 | 96.04 |
| YA-1 High | 109 | 131 | 101 | 20.2 | 92.66 |
| YA-2 High | 118 | 141 | 113 | 19.5 | 95.76 |

TABLE V-continued

Sample weights and calculated values for steamed chicken breast #2.

| STEAMED #2 | green wt. (g) | post-inject (g) | post cook wt (g) | % pump | % cook yield |
|---|---|---|---|---|---|
| YA-3 High | 123 | 150 | 116 | 22.0 | 94.31 |
| YA-4 High | 110 | 132 | 109 | 20.0 | 99.09 |
| TPPP Control | 100 | 126 | 100 | 26.0 | 100.00 |

Again, one of the 0.25% "low" marinades was inadvertently injected at too high a pump level (30.7%), likely inflating its cook yield. However, the data for the remaining samples showed that cook yield increased with increasing yield additive concentration in a linear fashion. The YA increased steamed sample cook yield to a degree comparable to that obtained using the inorganic phosphates. (STPP and TPPP)

Sensory Results

The sensory panelists indicated that the high levels of YA-1, YA-2, YA-3 and YA-4 produced off-flavors. This can and will be remedied in commercial practice by adjusting the levels of the organic salts to produce the optimal balance between functionality and flavor profile. For example, the level of acetate, which produces acceptable flavor notes and improves yield, may be increased and the level of proprionate, which produces less desirable flavor notes, may be decreased.

It should also be noted that comments on the medium and low levels of YA-1, YA-2, YA-3 and YA-4 varied as to the off flavors. Most importantly, all medium and low levels of yield additives were found to be acceptable by some panelists.

Conclusions

Cook yield and sensory panel data support the use of the yield additives of the invention as a phosphate replacer to improve cook yield. The data also shows that the cooking process (i.e., baking vs. steaming in bag) can play a significant part in the effectiveness of marinades containing the yield additives tested and other yield additives in accordance with the invention.

Example 2

This example examined the contribution of marinades containing organic acid salts similar to those present in the yield additives of Example 1, but in the absence of the fermentation-derived peptides and polypeptides as well as phospholipids present in the spent bacterial cell membranes. The cook yield results are reported in the following Tables VI-VIII.

TABLE VI

| Cook Method | | Based % cook yield |
|---|---|---|
| Steamed | No Marinade | 80.44 |
| Steamed | Sodium Lactate | 86.82 |
| Steamed | Potassium Acetate | 86.98 |
| Steamed | Sodium Citrate | 87.26 |
| Steamed | Tartrate, Potassium Sodium Tetrahydrate | 87.40 |
| Steamed | Sodium Succinate, 6-hydrate | 87.78 |
| Steamed | Potassium Succinate | 88.00 |
| Steamed | Sodium Acetate | 89.27 |
| Steamed | Marinade w/Seasoning Only | 89.89 |

TABLE VI-continued

| Cook Method | | Based % cook yield |
|---|---|---|
| Steamed | Sodium Propionate | 90.67 |
| Steamed | Potassium Lactate | 92.04 |
| Steamed | Control - STTP | 92.41 |
| Steamed | Control - TPPP | 93.02 |
| Steamed | Potassium Citrate | 93.29 |
| Steamed | Potassium Propionate | 93.78 |

TABLE VII

| Cook Method | Description | Percentage cook yield |
|---|---|---|
| Baked | Lactate, Sodium | 92.122 |
| Baked | Fumaric Acid, Disodium Salt | 91.968 |
| Baked | Citrate, Potassium | 91.471 |
| Baked | Succinate, Sodium 6-hydrate | 91.188 |
| Baked | Lactate, Calcium | 91.164 |
| Baked | Acetate, Potassium | 90.917 |
| Baked | Caprylate, Sodium | 90.815 |
| Baked | Tartrate, Potassium Sodium Tetrahydrate | 90.549 |
| Baked | Propionate, Potassium | 90.465 |
| Baked | Adipate, Potassium | 90.403 |
| Baked | Succinate, Potassium anhydrous | 89.777 |
| Baked | Gluconate, Potassium | 89.159 |
| Baked | Propionate, Sodium | 88.268 |
| Baked | Acetate, Sodium | 87.077 |
| Baked | Citrate, Sodium | 85.828 |
| Baked | Succinate, Disodium | 83.955 |

TABLE VIII

| Cook Method | | Percentage cook yield |
|---|---|---|
| Baked | Tartrate, Potassium Sodium Tetrahydrate | 82.65 |
| Baked | No Marinade | 84.21 |
| Baked | Potassium Acetate | 84.40 |
| Baked | Potassium Succinate | 85.49 |
| Baked | Sodium Lactate | 87.10 |
| Baked | Sodium Citrate | 87.41 |
| Baked | Sodium Acetate | 89.98 |
| Baked | Sodium Succinate, 6-hydrate | 90.84 |
| Baked | Marinade w/Seasoning Only | 92.22 |
| Baked | Sodium Propionate | 93.53 |
| Baked | Potassium Citrate | 95.03 |
| Baked | Potassium Lactate | 95.40 |
| Baked | Potassium Propionate | 97.45 |
| Baked | Control - STTP | 98.42 |
| Baked | Control - TPPP | 99.15 |

It is noted from the above data that some of the marinades containing the yield additive at 0.25% were as effective in juiciness and cook yield as those containing 0.5% phosphate. As a result, it is believed that the yield additives of the invention can be used at levels of 0.25% or less which will reduce costs and minimize any flavor off-notes.

Additionally, an analogue to YA-1 containing no peptides, polypeptides or phospholipids was made up from sodium acetate, sodium propionate, sodium succinate, sodium citrate and tartrate as set forth in Table IX below.

TABLE IX

| Ingredients | YA-1 Analogue | YA-1 |
|---|---|---|
| Seasoning Mix | 4.273 | 4.273 |
| Sodium Acetate | 0.246 | |
| Sodium Propionate | 0.454 | |

TABLE IX-continued

| Ingredients | YA-1 Analogue | YA-1 |
|---|---|---|
| Sodium Succinate, 6-hydrate | 0.150 | |
| Sodium Citrate | 0.019 | |
| Tartrate, Potassium Sodium Tetrahydrate | 0.021 | |
| YA-1 | | 1.250 |

The cook yields of chicken breasts made with marinades using YA-1 and the YA-1 analogue were then examined. The respective cook yields were 86.81% for YA-1 and 83.77% for the YA-1 analogue.

This highlights the finding that marinades containing the organic acid salts alone (i.e., in the absence of the peptides/polypeptides or phospholipids), at the same level as found in the marinades containing the yield additive compositions, are not as effective as the yield additive compositions, thereby establishing the contribution of the polypeptides, peptides and phospholipids.

Example 3

The objective of this example was to determine if the yield additives of the invention can replace sodium tripolyphosphate as a natural yield enhancer on a taste basis. In order to do this a sensory panel of six was convened to determine if the panelists could detect a difference in juiciness compared to a control sodium tripolyphosphate sample and if any off flavor characteristics are perceived.

Samples A-N were prepared as set forth in Table X.

TABLE X

| A | Sodium Tripolyphosphate Control |
|---|---|
| B | YA-1 Medium |
| C | YA-2 Medium |
| D | YA-3 Medium |
| E | YA-4 Medium |
| F | YA-1 Low |
| G | YA-2 Low |
| H | YA-3 Low |
| I | YA-4 Low |
| J | YA-1 High |
| K | YA-2 High |
| L | YA-3 High |
| M | YA-4 High |
| N | Tetra Potassium Pyrophosphate Control |

Product Preparation 4 oz boneless skinless chicken breast samples were injected with 20% marinade. The samples were kept under refrigeration for two days (baked) and three days (steamed), respectively.

The baked chicken was cooked at 400° F. to a minimum internal temperature of 170° F. The steamed chicken was cooked at 212° F. to a minimum internal temperature of 170° F. All of the samples were held under heating lamps until served.

Two pieces of chicken were served to the panelists on a weight boat labeled with the letters set forth above corresponding to each sample. Each panelist was served 4-5 experimental samples were served simultaneously with the control samples.

The sensory panel results were as follows in Table XI:

TABLE XI

| | Baked Comments | Steamed Comments |
|---|---|---|
| A (Sodium Tripolyphosphate Control) | Standard<br>No off flavors (4) | Standard<br>No off flavors (6) |
| B (YA-1 Medium) | More juicy (3)<br>Slight off note (1) | More juicy (2)<br>Similar juiciness (2)<br>Less juicy (2)<br>Metallic/Sour off flavor (4) |
| C (YA-2 Medium) | More juicy (2)<br>Similar juiciness (1)<br>Less juicy (1) | More juicy (3)<br>Less juicy (3)<br>No off flavor (3) |
| D (YA-3 Medium) | More juicy (4)<br>Egg like off flavor (2) | More juicy (4)<br>Similar juiciness (2)<br>Off flavor (3)<br>No off flavor (3) |
| E (YA-4 Medium) | More juicy (4)<br>Roasted (2)<br>Slight dirty note (1)<br>Bitter off note (1) | More juicy (4)<br>Less juicy (2)<br>Off flavor (3)<br>No off flavor (3) |
| F (YA-1 Low) | More juicy (2)<br>Similar juiciness (2)<br>Metallic off flavor (2) | More juicy (2)<br>Similar juiciness (2)<br>Less juicy (2)<br>Off flavor (2)<br>No off flavor (2) |
| G (YA-2 Low) | More juicy (4)<br>Egg like off flavor (3) | Similar juiciness (2)<br>Less juicy (4)<br>No off flavor (4)<br>Mealy texture (2) |
| H (YA-3 Low) | More juicy (2)<br>Similar juiciness (1)<br>Less juicy (1)<br>No off flavor (4) | Similar juiciness (2)<br>Less juicy (4)<br>No off flavor (3)<br>Grain like off note (2) |
| I (YA-4 Low) | More juicy (4)<br>Metallic off flavor (2) | More juicy (4)<br>Similar juiciness (1)<br>Less juicy (1)<br>Slight off flavor (2)<br>No off flavor (1) |
| J (YA-1 High) | More juicy (3)<br>Less juicy (1)<br>Strong sour off flavor (3) | Did Not Evaluate |
| K (YA-2 High) | More juicy (2)<br>Similar juiciness (2)<br>Strong sour off flavor (3) | Did Not Evaluate |
| L (YA-3 High) | More juicy (3)<br>Similar juiciness (1)<br>Strong sour off flavor (2) | Did Not Evaluate |
| M (YA-4 High) | More juicy (3)<br>Less juicy (1)<br>Strong sour off flavor (4) | Did Not Evaluate |
| N (Tetra Potassium Pyrophosphate) | Similar to control<br>Spongy texture | More juicy (1)<br>Similar juiciness (2)<br>Less juicy (3)<br>No off flavor (2)<br>Slight off flavor (1) |

The sensory panels indicated that the low and medium levels of YA-1, YA-2, YA-3 and YA-4 were acceptable-to-preferred alternatives to sodium tripolyphosphate based on flavor and other organoleptic properties.

Example 4

Cook yields were determined for marinade formulations made with and without 0.10% YA (delivered), boneless, skinless chicken breasts pumped at 20%. The results are reported in Table XII below.

TABLE XII

| Ingredient | | | | | | | | |
|---|---|---|---|---|---|---|---|---|
| Seasoning Mix | 4.273 | 4.273 | 4.273 | 4.273 | 4.273 | 4.273 | 4.273 | 4.273 |
| YA | 0.500 | | 0.500 | | 0.500 | | 0.500 | |
| Gums | 0.126 | 0.126 | | | 0.313 | 0.313 | 0.313 | 0.313 |
| Dextrin | | | 2.700 | 2.700 | | | | |
| Modified Starch | | | | | 0.675 | 0.675 | | |
| Starch | | | | | | | 0.675 | 0.675 |
| Water | 95.101 | 95.601 | 92.527 | 93.027 | 94.239 | 94.739 | 94.239 | 94.739 |
| TOTAL | 100.000 | 100.000 | 100.000 | 100.000 | 100.000 | 100.000 | 100.000 | 100.000 |
| % cook yield | 89.8 | 87.6 | 88.0 | 86.1 | 90.2 | 89.5 | 81.1 | 78.6 |

All references, including publications, patent applications, and patents, cited herein are hereby incorporated by reference to the same extent as if each reference were individually, and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A marinade for meat and seafood comprising acetate, propionate, lactate, citrate, tartrate and succinate sodium or potassium salts, polypeptides, peptides, phospholipids, and *propionibacterium*,
   said marinade having only acetate, succinate and propionate organic sodium or potassium salts with these salts present at levels of 12% or more by weight of the weight of acetate, propionate, lactate, citrate, tartrate and succinate sodium or potassium salts, polypeptides, peptides, phospholipids, and *propionibacterium* present in the marinade.

2. The marinade of claim 1 in which one or more other bacterial species are present in addition to the *propionibacterium*.

3. The marinade of claim 1 including xanthan gum or similar polysaccharides produced by lactic acid bacteria in the marinade.

4. The marinade of claim 1 also including one or more of salts, spices, flavorings, acids, starches and gums.

5. A meat or seafood substrate containing about 0.01 to 2.0% by weight of a yield additive including acetate, propionate, lactate, citrate, tartrate and succinate sodium or potassium salts, polypeptides, peptides, phospholipids, and *propionibacterium*,
   said yield additive having only acetate, succinate and propionate organic sodium or potassium salts with these salts present at levels of 12% or more by weight of the weight of the acetate, propionate, lactate, citrate, tartrate and succinate sodium or potassium salts, polypeptides, peptides, phospholipids, and *propionibacterium* in the yield additive.

6. The meat or seafood substrate of claim 5 in which the yield additive includes one or more of salts, spices, flavorings, acids, starches and gums.

7. The meat or seafood substrate of claim 5 in which the yield additive includes one or more other bacterial species in addition to the *propionibacterium*.

8. The meat or seafood substrate of claim 5 in which the yield additive includes xanthan gum or similar polysaccharides produced by lactic acid bacteria.

9. A method of making a marinade for meat and seafood comprising:
   fermenting milk sugars, whey sugars, dextrose or other suitable sugars with a food grade bacterial culture of *propionibacterium* to produce acetate, propionate, lactate, citrate, tartrate and succinate acids, one or more phospholipids derived from bacterial cell membranes and fermentation-derived peptides and polypeptides; and
   converting the organic acids to organic salts by reaction with NaOH or KOH,
   producing a marinade having only acetate, succinate and propionate organic sodium or potassium salts with these salts present at levels of 12% or more by weight of the weight of the acetate, propionate, lactate, citrate, tartrate and succinate sodium or potassium salts, polypeptides, peptides, phospholipids, and *propionibacterium* in the marinade.

10. The method of claim 9 in which one or more other bacterial species are present in the bacterial culture in addition to the *propionibacterium*.

11. The method of claim 9 in which the bacterial culture also includes lactic acid bacteria employed to generate xanthan gum or similar polysaccharides.

12. The method of claim 9 in which one or more of salts, spices, flavorings, acids, starches and gums are added to the marinade.

* * * * *